(12) United States Patent
Xu et al.

(10) Patent No.: US 8,165,067 B2
(45) Date of Patent: Apr. 24, 2012

(54) APPARATUS AND METHOD OF 3G MOBILE COMMUNICATION CAPABLE OF IMPLEMENTING A MULTI-CHANNEL PROTOCOL

(75) Inventors: Bob Xu, Nanjing (CN); Hao-Liang Zhou, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 562 days.

(21) Appl. No.: 12/382,838

(22) Filed: Mar. 25, 2009

(65) Prior Publication Data

US 2009/0252090 A1 Oct. 8, 2009

(30) Foreign Application Priority Data

Mar. 25, 2008 (TW) ................................ 97110599 A (51) Int. Cl.
*H04W 4/00* (2009.01)
(52) U.S. Cl. ........................................................ 370/328
(58) Field of Classification Search .................... 370/328
See application file for complete search history.

(56) References Cited

U.S. PATENT DOCUMENTS

| | | | |
|---|---|---|---|
| 7,590,089 B2* | 9/2009 | Park et al. .................... 370/329 |
| 2005/0136919 A1* | 6/2005 | Park et al. .................... 455/432.3 |
| 2005/0238051 A1* | 10/2005 | Yi et al. .................... 370/469 |
| 2006/0120354 A1* | 6/2006 | Sohn et al. .................... 370/352 |
| 2006/0198303 A1* | 9/2006 | Iacono et al. .................... 370/229 |
| 2008/0151758 A1* | 6/2008 | Weinrib et al. .................... 370/238 |
| 2008/0225878 A1* | 9/2008 | Cordeiro et al. .................... 370/437 |
| 2009/0073880 A1* | 3/2009 | Park et al. .................... 370/235 |
| 2009/0129326 A1* | 5/2009 | Kim et al. .................... 370/329 |
| 2010/0232366 A1* | 9/2010 | Iwamura et al. .................... 370/329 |
| 2010/0296464 A1* | 11/2010 | Barraclough et al. .................... 370/329 |
| 2011/0090865 A1* | 4/2011 | Lerzer et al. .................... 370/331 |

* cited by examiner

*Primary Examiner* — Kenny Lin
*Assistant Examiner* — Faisal Choudhury
(74) *Attorney, Agent, or Firm* — Bacon & Thomas, PLLC (57) ABSTRACT

This invention discloses an apparatus and a method of 3G mobile communication capable of implementing a multi-channel protocol. The 3G mobile communication apparatus includes: an application layer, for providing applications to transmit voice data; a multi-channel processing layer, for simulating at least one physical communication port of the 3G mobile communication apparatus into virtual logical data channels by software according to priority of the data transmitted, and each virtual logical data channel is connected to the data processing layer, and a multi-channel protocol layer is provided for transmitting the data received by the 3G mobile communication apparatus to the data processing layer according to the priority of the data; and a 3G wireless communication module, which is a wireless communication interface, for connecting the bus interface and achieving a signal connection of the 3G mobile communication apparatus with a base station.

27 Claims, 5 Drawing Sheets

APPARATUS AND METHOD OF 3G MOBILE COMMUNICATION CAPABLE OF IMPLEMENTING A MULTI-CHANNEL PROTOCOL

FIELD OF THE INVENTION

The present invention relates to an apparatus and a method of a 3G mobile communication, and more particularly to an apparatus and a method of a 3G mobile communication capable of using virtual logical data channels to implement a data communication between a control module and a wireless communication module thereof according to priority level of data packet.

BACKGROUND OF THE INVENTION

As mobile communication technology advances rapidly and the Internet blooms, there is a substantial change to our lifestyle and work, and mobile communication apparatus has become one of the indispensable tools in our daily life and work. The development process of mobile communications in a chronological order is described briefly as follows:

(1) The first generation (1G) mobile communication technology: It is an analog communication technology capable of transmitting voices only, and includes technical specifications such as AMPS and TACS, etc. The drawbacks of the first generation (1G) mobile communication technology include limited capacity, many technical specifications, incompatibility, poor security, low communication quality, and incapable of providing data business or automatic roaming.

(2) The second generation (2G) mobile communication technology: It includes technical specifications such as GSM (including DCS), TDMA and CDMA, and has the major features of providing digital voice business and low-speed data transmission business. Although the second generation (2G) mobile communication technology has improved voice quality and security, and provided automatic roaming business, each technical specification adopt a different technical measures, the mobile communication standards cannot be unified, and thus users can have roaming conducted within a range covered by the communication technology of a same technical specification only. In addition, since bandwidth of the second generation communication system is limited, the scope of applications of the data transmission business is restricted greatly, and a high-speed data transmission business such as the multimedia data transmission business cannot be achieved.

(3) The third Generation (3G) mobile communication technology mainly includes three specifications, respectively W-CDMA, CDMA2000 and TD-SCDMA. Compared with the first generation (1G) and second generation (2G) mobile communication technologies, the third Generation (3G) mobile communication technology features a higher transmission rate and a broader bandwidth than the previous two generations, and the 3G mobile communication technology has a minimum transmission rate of is 384K bps, and a maximum transmission rate of 2M bps, and the bandwidth is up to 5 MHz. Such specification not only allows voice data transmissions, but also provides a fast and convenient application of wireless transmissions such as logging on the Internet via a wireless connection, so that users can have communication services with a low price and a plentiful content.

From the description above, the third generation (3G) mobile communication apparatus refers to a new communication system integrating multimedia communications including wireless communications and the Internet with respect to the first-generation analog mobile phone and the second-generation GSM and CDMA digital mobile phone. The third generation (3G) mobile phone not only processes multimedia information such as graphics, music and video streams and provides information services such as multimedia information, website browsing, telephone conference, and e-commerce, but also supports different transmission rates. In other words, the 3G mobile phone can support wireless transmission rates of at least 2 M bps, 384 k bps and 144 kbps indoors, outdoors, and in a driving environment.

At present, the technical standard of 3G mobile communication apparatus is divided mainly into the following three wireless connection standards according to the International Telecommunications Union (ITU):

(1) Wideband Code Division Multiple Access (W-CDMA): Main supporters thereof include European GSM system manufacturers such as Ericsson, Alcatel, Nokia, Lucent, Nortel and some Japanese companies such as NTT, Fujisitu and Sharp. Based on present existing GSM systems, the W-CDMA creates a transitional 3 G communication network system. Since the GSM system is very popular in Europe and Asia, W-CDMA has competitive advantages in the European and Asian markets.

(2) Code Division Multiple Access 2000 (CDMA2000): This is a communication network system mainly proposed and developed by the North American Qualcomm Company and originally supported by Motorola, Lucent and Samsung. Samsung primarily established the CDMA2000 standard, which is derived from the narrow-band CDMA One and upgraded the standard from the original CDMA One structure to 3G, and thus the cost for establishing the system is relatively low. The regions using CDMA include Japan, Korea and North America only, and thus the number of CDMA2000 supporters is not as large as the number of W-CDMA supporters, but the research and the technology of the CDMA2000 are developed most quickly among these standards, and a large number of 3G mobile phones adopting the CDMA2000 standard are available in the market.

(3) Time Division-Synchronous Code Division Multiple Access (TD-SCDMA): This is a 3G standard developed and established solely by the People of Republic of China. On Jun. 29, 1999, Datang Telecom (former Telecommunications Science and Technology, Department of Post and Telecommunications) proposed the TD-SCDMA standard to the ITU, and the TD-SCDMA has unique advantages on the application of frequency band, the support of communication business, the flexibility of frequency, and the cost. Besides, since the internal market of China is very huge, major telecommunication equipment manufacturers pay much attention to the TD-SCDMA, and over half of the equipment manufacturers in the world have announced their support to the TD-SCDMA standard.

Figure 1:
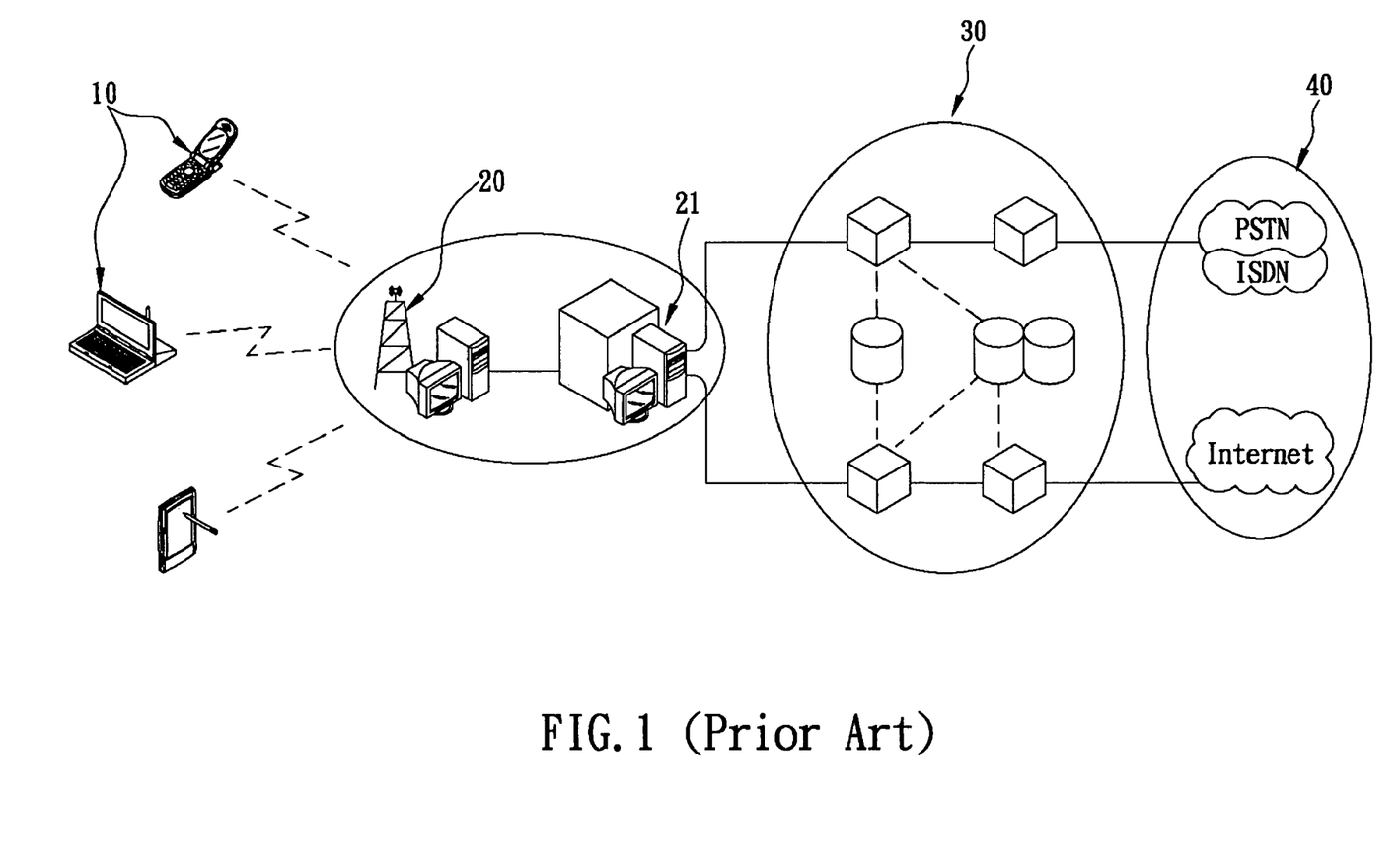
FIG. 1 is a schematic view of a structure of a conventional W-CDMA 3G mobile communication system.
Figure 2:
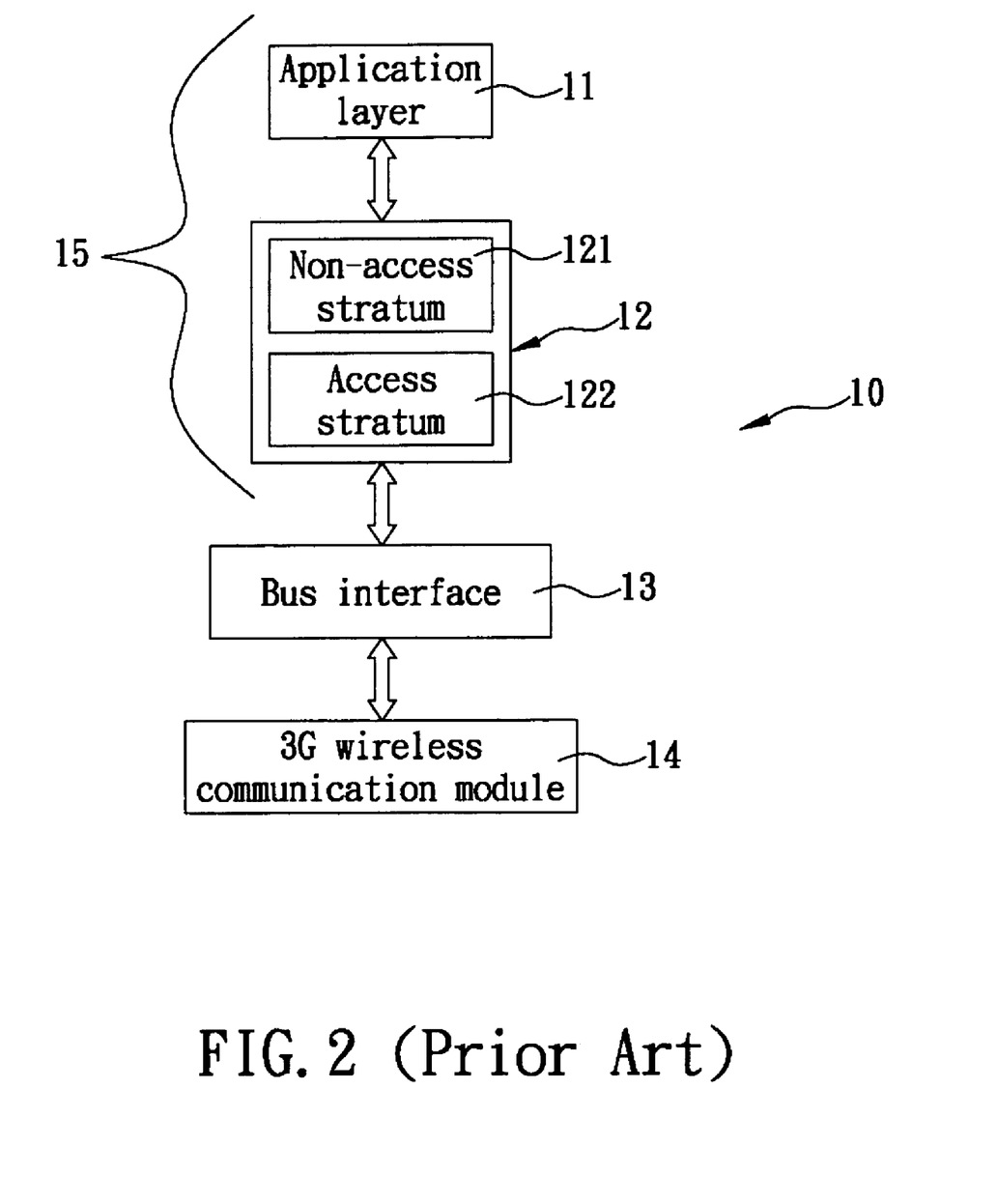
FIG. 2 is a schematic view of a structure of a conventional W-CDMA 3G mobile communication apparatus.

With reference to the conventional W-CDMA 3G mobile communication system as shown in FIG. 1, the system accesses W-CDMA signals via wireless transmissions, so that a 3G mobile communication apparatus 10 (such as a mobile phone or a PDA) can complete a signal connection with a base station 20, and the base station 20 performs an exchange of wireless resource communication protocol information with a remote network console 21. A core network 30 is connected to a telecommunications network 40 such as PSTN, ISDN, and the Internet for performing various different 3G voice data transmission services. In general, the conventional W-CDMA 3G mobile communication apparatus 10 adopts a system architecture of the W-CDMA 3 G communication protocol as shown in FIG. 2 and comprises four main sections: an application layer 11, a data processing layer 12, a bus interface 13 and a 3G wireless communication module 14, wherein the application layer 11 is used for providing a voice data transmission application such as telephone application, short message application, wireless application protocol (WAP), streaming medium application and video telephone application. The data processing layer 12 includes a non-access stratum 121 and an access stratum 122, wherein the non-access stratum 121 includes a communication protocol layer such as MM, GMM, RABM, CC, SM, GSMS, SS and CBS, and its main job is not related to the wireless access, but it is a communication protocol related to the execution and service link configuration for performing the works of:
(1) performing registration, certification and management of a user's ID;
(2) managing the moving of a terminal equipment;
(3) managing the CS/PS telephone call connection service; and
(4) setting the parameters of CS/PS telephone service channel.

The access stratum 122 includes a communication protocol layer such as MAC, RLC, PDCP, BMC and RRC for a wireless access of W-CDMA 3G to perform the works of:
(1) performing the control, parameter setup, and QoS control of wireless system resource distribution and the setup of wireless channel transmission format; and
(2) performing a compression process of an application layer communication protocol, and a division and a rearrangement of service packets.

The bus interface 13 is a USB (Universal Serial Bus) or UART (Universal Asynchronous Receiver/Transmitter) bus interface for connecting a physical communication port of the 3G mobile communication apparatus 10 to the 3G wireless communication module 14. The 3G wireless communication module 14 provides a wireless communication interface, so that the 3G mobile communication apparatus 10 can complete a signal connection with the base station 20.

When terminal application developers of the 3G mobile communication apparatus develop terminal applications, a software solution provided by the communication protocol provider includes a total software and hardware solution of an operating system (OS) platform, a graphical user interface (GUI) and a wireless communication protocol. Although the terminal application developers provide us tremendous convenience for the development of terminal applications, a variety of personalized designs and extended functions also brings us a high level of difficulty and has limitations to the personalized design and the extended function.

As the TD-SCDMA and W-CDMA 3G wireless communication technology develops rapidly, the 3G wireless communication business is provided to the terminal application developers through wireless communication modules, and thus there is a data communication issue between the wireless communication module and the control module. Since the 3G wireless communication business includes a voice data transmission such as telephone, short message, wireless application protocol (WAP), streaming medium and video telephone, therefore it is an important subject for terminal application developers to design a multi-channel management method to cover complicated data transmissions between the control module and the wireless communication module, so that the terminal application developers of the 3G mobile communication apparatus can develop different 3G terminal applications with personalized designs and functions more quickly and efficiently.

SUMMARY OF THE INVENTION

In view of the shortcomings of the prior art, the inventor of the present invention based on years of experience in the related industry to conduct extensive researches and experiments, and finally developed a 3G mobile communication apparatus capable of implementing a multi-channel protocol and its method in accordance with the present invention to overcome the data communication issue between the wireless communication module and the control module of the prior art.

Therefore, it is a primary objective of the present invention to provide a 3G mobile communication apparatus capable of implementing a multi-channel protocol, and the 3G mobile communication apparatus comprises: an application layer, for providing a voice data transmission application; a data processing layer, coupled to the application layer, for performing work of a service link configuration and a wireless access, and the data processing layer and the application layer forming a control module of the 3G mobile communication apparatus; a multi-channel processing layer, for using a software to form a plurality of virtual logical data channels from at least one physical communication port of the 3G mobile communication apparatus according to the priority level of data of data packet being transmitted, and each virtual logical data channel being coupled to the data processing layer, and using a multi-channel protocol layer for determining an information data packet received by the 3G mobile communication apparatus, and transmitting the data packet through the corresponding virtual logical data channel to the data processing layer according to the priority level of the data of the data packet; at least one bus interface, for connecting a physical communication port of the 3G mobile communication apparatus; and the 3G wireless communication module, comprising a wireless communication interface, for connecting the bus interface, and allowing the 3G mobile communication apparatus to complete a signal connection with a base station. Therefore, the virtual logical data channels on the 3G mobile communication apparatus can be used to implement a data communication between the control module and the wireless communication module according to the priority level of the data of the data packet.

Another objective of the present invention is to provide a method of implementing a multi-channel protocol in a 3G mobile communication apparatus, and the method is applied to the 3G mobile communication apparatus, and the 3G mobile communication apparatus comprises an application layer for providing a voice data transmission application; a data processing layer connected to the application layer for performing a service link configuration and a wireless access, and combined with the application layer to form a control module; at least one bus interface, for connecting a physical communication port of the 3G mobile communication apparatus; and a 3G wireless communication module, comprising a wireless communication interface for connecting the bus interface, and allowing the 3G mobile communication apparatus to complete a signal connection with a base station. The method comprises the steps of: using software to form a plurality of virtual logical data channels from at least one physical communication port of the 3G mobile communication apparatus according to the priority level of data of the data packet being transmitted by the 3G mobile communication apparatus, and connect each virtual logical data channel with the data processing layer; creating a multi-channel protocol layer between the virtual logical data channels and the bus interface; using the multi-channel protocol layer to examine an information data packet received by the 3G mobile communication apparatus, and transmitting the data packet to the data processing layer through the virtual logical data channel according to the priority level of the data of the data packet. Therefore, the virtual logical data channels on the 3G mobile communication apparatus implements a data communication between the control module and the wireless communication module according to the priority level of the data of the data packet, such that the data communication between the control module and the wireless communication module has better generality and expandability.

The objects, technical characteristics and effects of the present invention will become apparent from the following detailed description taken with the accompanying drawings.

DETAILED DESCRIPTION OF THE PREFERRED EMBODIMENTS

To make it easier for our examiner to understand the technical characteristics of the present invention, we use preferred embodiments together with the accompanying drawings for the detailed description of the invention as follows:

The present invention uses software to form a plurality of virtual logical data channels from at least one physical communication port of the 3G mobile communication apparatus 10 in the present existing system architecture of 3G mobile communication apparatus 10 as shown in FIG. 2 to implement a data communication between the control module 15 and the 3G wireless communication module 14. It is noteworthy to point out that the control module 15 represents a structure integrated with the application layer 11 and the data processing layer 12 for the following illustration.

Figure 3:
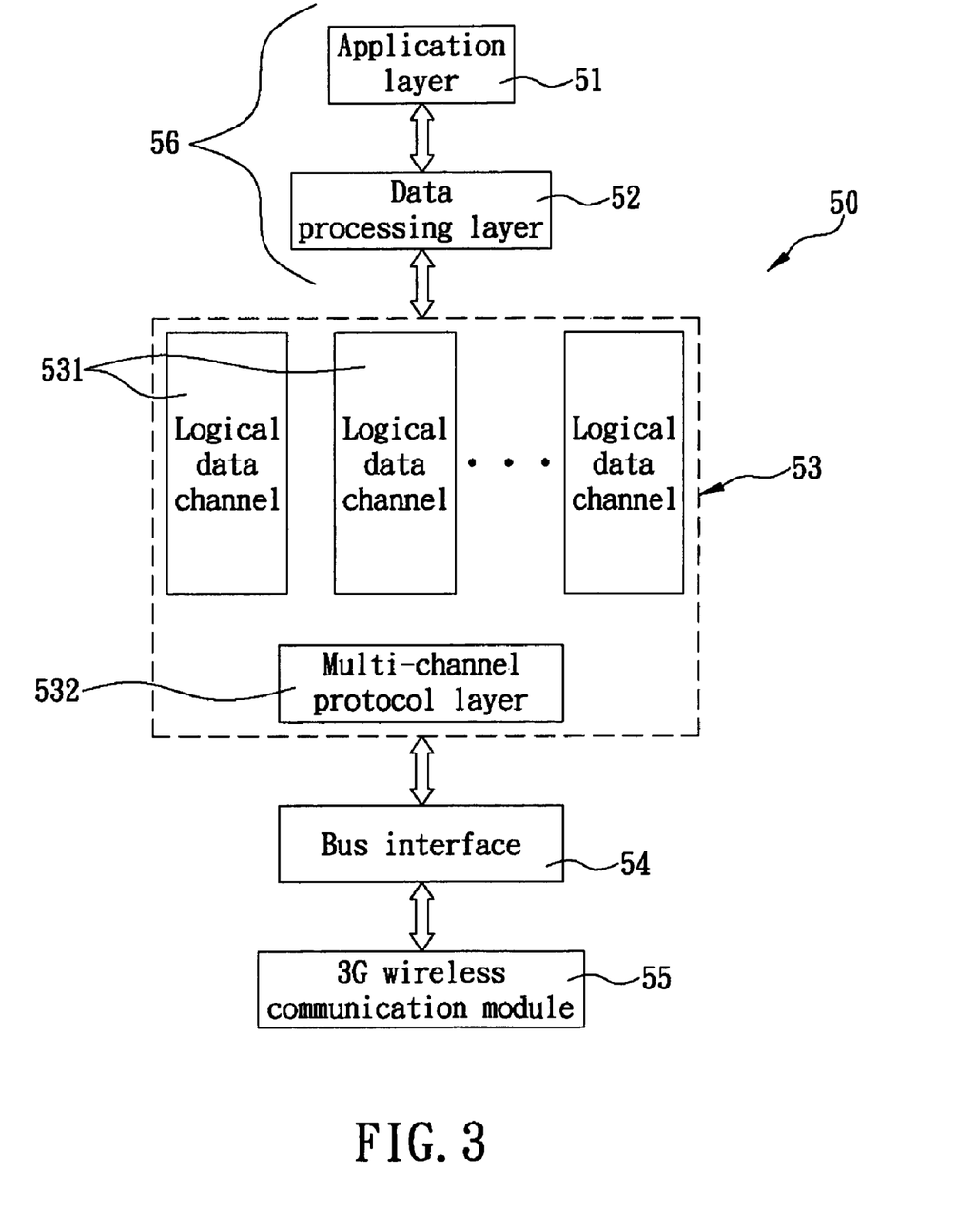
FIG. 3 is a schematic view of a structure of a 3G mobile communication apparatus in accordance with the present invention.

With reference to FIG. 3 for a 3G mobile communication apparatus capable of implementing a multi-channel protocol and its method, the method is applied to a 3G mobile communication apparatus 50, and the system architecture of the 3G mobile communication apparatus 50 with reference to FIG. 3 comprises an application layer 51, a data processing layer 52, a multi-channel processing layer 53, at least one bus interface 54 and a 3G wireless communication module 55, wherein the application layer 51 is provided for a voice data transmission application such as telephone application, short message application, WAP, stream media application, or video telephone application. The data processing layer 52 is used for performing work related to service link configuration and wireless access. The multi-channel processing layer 53 use software to form a plurality of virtual logical data channels 531 from at least one physical communication port of the 3G mobile communication apparatus 50, and a multi-channel protocol layer 532 to implement a data communication between a control module 56 (which is a structure integrating the application layer 51 and the data processing layer 52) and the 3G wireless communication module 55. The bus interface 54 is a USB or UART bus interface, for connecting a physical communication port of the 3G mobile communication apparatus 10 with the 3G wireless communication module 55. The 3G wireless communication module 55 provides a wireless communication interface, such that the 3G mobile communication apparatus 50 can complete a signal connection with the base station.

In general, the data communication between the 3G mobile communication apparatuses includes two types: a control data and a stream data, wherein the control data adopts a standard AT (attach) command and has the features of a small data volume, a high requirement for integrity, and a quick transmission rate, and the stream data is usually a network data (such as TCP/IP data and video data) having a large data transmission volume, but requiring a lower integrity than the control data. The present invention divides the channels of transmitting data packets between the 3G mobile communication apparatuses into the following types according to the priority levels of the data packets transmitted between the 3G mobile communication apparatuses. However, a preferred embodiment is used for illustrating the invention only, but not intended for limiting the scope of the invention. Users can freely set the number of channels and the priority levels according to the actual design requirements:

(1) It is necessary to actively provide an AT channel (for unsolicited messages) having the highest priority such as incoming call information data that must be transmitted through the channel.
(2) A channel using general AT commands is used for transmitting control data such as a general AT command having a second highest priority.
(3) A data channel is used for transmitting stream data such as TCP/IP data and video data received and transmitted through the channel.

From the description above, the data packets transmitted through the channels in the present invention mainly come with two different formats, respectively an information data packet and a control data packet, wherein the control data packet is divided by its nature into an acknowledgement packet (ACK) and a non-acknowledgement packet (NAK), and the acknowledgement packet is examined to be valid by a receiving party when the information data packet is transmitted, and the receiving party transmits the control data packet with a format of 0Xf9, 0X06; and the non-acknowledgement packet is examined to have an error by the receiving party when the information data packet is transmitted, and the receiving party transmits the control data packet with a format 0Xf9, 0X21.

In the present invention, the multi-channel transmission of information data packet as listed in the following table includes the following fields:

TABLE 1

Format of Multi-channel Information Data Packet

| Head HEAD | Channel number | Packet Count | Length | | Content CON-TENT | Checksum | Tail TAIL |
|---|---|---|---|---|---|---|---|
| (0Xf9) | CID | PC | LEN1 | LEN2 | | CHECKSUM | (0Xf9) |
| 1 byte | 1 byte | 1 byte | 1 byte | 1 byte | length bytes | 1 byte | 1 byte |

(1) Head Field: This field occupies 1 byte for recording a head value, and all information data packets start with a head of 0xf9.
(2) Channel number (CID) Field: This field occupies 1 byte for recording a channel number to denote the channel used for transmitting an information data packet, and only a previously defined channel can be used.
(3) Packet Count (PC) Field: This field occupies 1 byte for recording a packet count value, which is incremented by one if an information data packet is transmitted, and remains unchanged if the information data packet is resent or the ACK or NAK control data packet is transmitted. Each channel requires a packet count value for counting independently. If a data packet is received, the receiving party needs to maintain the packet count value of the channel. If the current packet count value of the information data packet is equal to the previous packet count value plus 1, it shows that the data packet is received correctly. If the packet count value is equal to the previous packet count value, it shows that a transmitting party is resending the previous information data packet. If the packet count value is equal to any other value, it shows that there is a data loss.
(4) Length Field: This field occupies two bytes, for recording a length value, and the range of the length value is negotiated by both communication parties, wherein len1 is a low byte, and len2 is a high byte, and the length value is used for recording the length after the data content excluding the checksum value and the tail value.
(5) Content Field: This field occupies a number of bytes denoted by the length for recording a content of the information data packet.
(6) Checksum Field: This field occupies 1 byte for recording a checksum value calculated by the formula:

Checksum=(CID+PC+len1+len2+C1+C2+ ... +Cn)+1, where C1 denotes the first byte of the content, C2 denotes the second byte of the content, ..., and Cn denotes the $n^{th}$ content byte.
(7) Tail Field: This field occupies 1 byte for recording a tail value, and all information data packets are ended with 0xf9.

Figure 4:
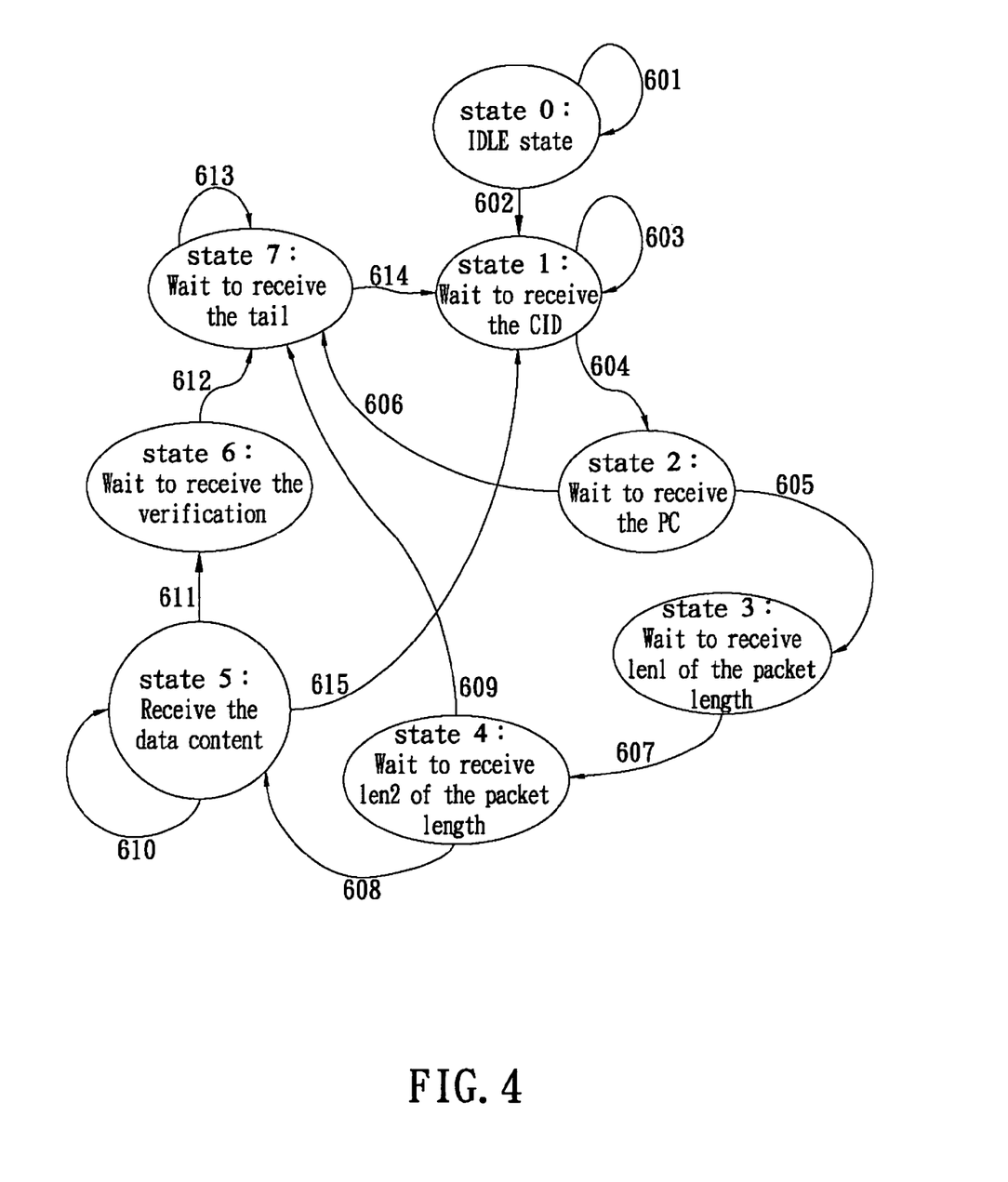
FIG. 4 is a flow chart of processing a multi-channel protocol layer of a receiver of data packet transmitted between 3G mobile communication apparatuses in accordance with the present invention.

With reference to FIG. 4 for a multi-channel transmission of the present invention, the data packet transmitted between the 3G mobile communication apparatuses includes the following eight states of the receiving party:
(1) State 0: It is an IDLE state referring to the state of creating a multi-channel communication between two communication parties. In this state, the communication data is not packeted.
(2) State 1: Wait to receive the CID;
(3) State 2: Wait to receive the PC;
(4) State 3: Wait to receive the low byte of the length value (which is len1);
(5) State 4: Wait to receive the high byte of the length value (which is len2);
(6) State 5: Receive the data content, and receive the data packet according to the length value labeled in the length field;
(7) State 6: Wait to receive the checksum value;
(8) State 7: Wait to receive the tail value 0xf9.

With reference to FIG. 4 again, in the multi-channel transmission process of the present invention, the way of transmitting data packet between the 3G mobile communication apparatuses by the multi-channel protocol layer 532 of the receiving party, and its software operation switches the aforementioned receiving party's states according to the following conditions:
(601) In the IDLE state, if a head value not having 0xf9 characters is received, then the state remains at the IDLE state, and the received data packet is processed as an AT command data.
(602) In the IDLE state, if a head value having 0xf9 characters is received, then the state is switched to State 1.
(603) In State 1, if a head value having 0xf9 characters is received continuously, then the state will remain at the State 1. In the meantime, it is necessary to count the head value of the received 0xf9 characters and acknowledge a head value of four 0xf9 characters for the count of every four 0xf9 characters.
(604) In State 1, if a correct CID is received, then the state will be switched to State 2.
(605) In State 2, if a correct PC is received, then the state will be switched to State 3.
(606) If the PC is determined to be incorrect, then the NAK will be transmitted and the state will be switched to State 7.
(607) In State 3, if 1 byte is received, the byte will serve as the len1 (which is a low byte), and the state will be switched to State 4.
(608) In State 4, if 1 byte is received, the byte will serve as the len2 (which is a high byte), and the len1 will be a low byte for merging into a length value.
If the length value falls within a negotiated range agreed by both communication parties, it shows that the received data is correct, and the state is switched to State 5.
(609) If the length value does not fall within a negotiated range agreed by both communication parties, it shows that there is a data loss, and a NAK will be transmitted and then the state will be switched to State 7.
(610) While the content of the information data packet is being received, the counting takes place. If the length of the received data is smaller than the length value, the state will remain at State 5.
(611) If the length of the received data is equal to the length value, it shows that the content of the information data packet is received, and the state is switched to State 6.
(612) In State 6, if 1 byte is received and serves as the checksum value, and compared with the calculated checksum value of the received data, and these two values are equal, then it shows that the information data packet is received correctly, and a counting of receipt on the channel is updated and the ACK is transmitted, and the state is switched to State 7. If the two values are unequal, it shows that there is an error on the receipt of the information data packet, and the NAK is transmitted, and then the state is switched to State 7 to wait for the transmitting party to resend the information data packet.
(613) In State 7, if a tail value having a value other than 0xf9 characters, the tail value will be abandoned, and the state will remain unchanged.
(614) In State 7, if a tail value having one 0xf9 character, the state will be switched to State 1.
(615) After the time of receiving the content of the information data packet is out, the current received information data packet will be abandoned, and the NAK will be transmitted, and the state will return to State 1.

Figure 5:
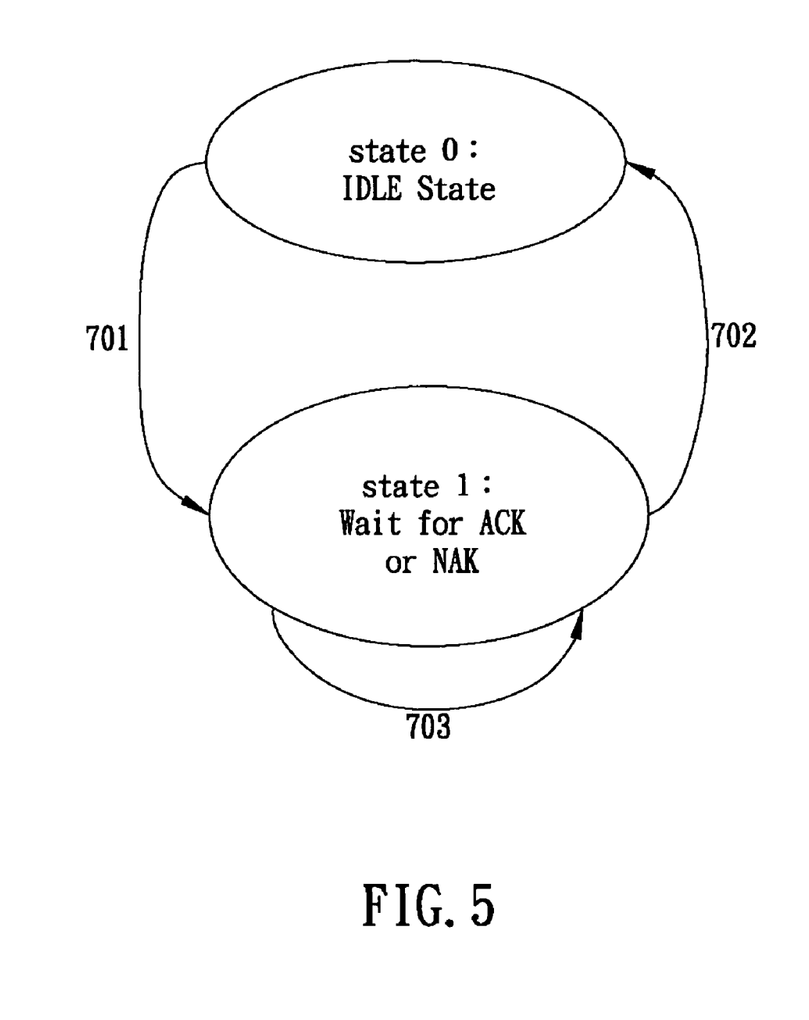
FIG. 5 is a flow chart of processing a multi-channel protocol layer of a transmitter of data packet transmitted between 3G mobile communication apparatuses in accordance with the present invention.

With reference to FIG. 5 for a multi-channel transmission process of the present invention, the transmitting party has the following two states:
(1) State 0: In the IDLE state, this state is entered after a multi-channel transmission between the 3G mobile communication apparatuses, or the state will be the IDLE state if there is no transmitted data packet.

(2) State 1: The state is switched to State 1 to wait ACK or NAK, after the information data packet is received.

In the multi-channel transmission process of the invention, the way of transmitting data packet between the 3G mobile communication apparatuses through the multi-channel protocol layer 532 of the transmitting party, and the state of the transmitting party is switched according to the following condition:

(701) In the IDLE state, if it is necessary to transmit an information data packet, or after the information data packet is switched, the state is switched to State 1.

(702) The state is returned to the IDLE state after the ACK is received in State 1.

(703) After the NAK is received in State 1 or the time for receiving the content of the information data packet is out, the information data packet is resent, and the state remains at the state of waiting for the ACK or NAK.

In general, both communication parties have the data error tolerance for the multi-channel transmission of data packet between the 3G mobile communication apparatuses. In other words, both parties have the capability of discovering an error and fixing the error. To assure the multi-channel protocol layer 532 of the receiving party to correctly receive an information data packet transmitted between the 3G mobile communication apparatuses in the multi-channel transmission process, the multi-channel protocol layer 532 must determine the validity of the received data packet according to the following two conditions:

(1) Since the checksum in the information data packet can effectively verify the correctness of the content of the information data packet, therefore the multi-channel protocol layer 532 must wait to receive a checksum in State 6 as shown in FIG. 4, and receive the checksum to identify an error.

(2) After the maximum length of transmitting data of an information data packet is confirmed, the time required for the receiving party to receive the information data packet must fall within a known range. Therefore, the multi-channel protocol layer 532 must be able to determine a data loss occurred in the transmission process by means of the time-out of receiving data content in State 5 as shown in FIG. 4.

In the multi-channel transmission process of the present invention, the transmission of NAK is used to notice the transmitting party about an error of data packet transmitted between the 3G mobile communication apparatuses found by the receiving party's multi-channel protocol layer 532 and request the transmitting party to resend the information data packet to compensate the error occurred in the multi-channel transmission process. In addition, the transmitting party has to wait to receive the receiving party's ACK during the multi-channel transmission in accordance with the present invention, before sending the next information data packet. As a result, the transmission of the information data packet is delayed, and the communication speed is reduced. In a practical application as shown in FIG. 2, a set of data measured from the transmission of 50K of data through a serial port are listed below:

TABLE 2

Influence of Multi-channel Protocol on Data Transmission Rate

| Serial Port Rate | Is the multi-channel opened? | Total Data Volume | Max. Transmission Length | Transmission Rate (b/s) |
| --- | --- | --- | --- | --- |
| 460800 | Yes | 50k | 1024 | 246561.02 |
|  | No |  | 1024 | 312758.22 |

In the practical application, the control data such as the AT command data is discrete, and thus there will be no delay of data transmissions when the receiving party produces an ACK and the receiving party waits to receive an ACK. In the meantime, the flexibility of the multi-channel layout allows the data channel to skip the confirmation and waiting operations and processes, so that the invention can effectively avoid the delay issue of a large volume of data transmitted between the 3G mobile communication apparatuses and occurred in the receiving party's multi-channel protocol layer 532.

In summation of the description above, the present invention uses software to form a plurality of virtual logical data channels 531 from at least one physical communication port of the 3G mobile communication apparatus 50, and uses a multi-channel protocol layer 532 to implement a data communication between the control module 56 and the 3G wireless communication module 55. The invention not only provides a very good generality and expandability, but also includes the following advantages:

1. Since the multi-channel information data packet has less attached information, therefore the overall transmission rate will not be affected significantly.
2. Each virtual logical data channel 531 comes with a function of confirming whether or not the transmitted/received data is correct when the multi-channel is established, such that if the application layer has a guarantee of reliable transmission protocol, then it is not necessary to have the resending mechanism. The invention can enhance the flexibility of the data transmission.
3. Since a plurality of virtual logical data channels 531 are created between the control module 56 and the 3G wireless communication module 55, the virtual logical data channels 531 are independent from each other without interference, so as to provide a better support to a large data transmission such as logging on a network and stream media.
4. The invention further supports a plurality of 3G wireless communication modules to meet the multi-mode requirements of the 3G mobile communication apparatus 50.

While the invention herein disclosed has been described by means of specific embodiments, numerous modifications and variations could be made thereto by those skilled in the art without departing from the scope and spirit of the invention set forth in the claims.

What is claimed is:

1. A method of implementing a multi-channel protocol in a 3G mobile communication apparatus, wherein the 3G mobile communication apparatus comprises an application layer for providing a voice data transmission application, a data processing layer coupled to the application layer for performing work related to a service link configuration and a wireless access, at least one bus interface coupled to a physical communication port of the 3G mobile communication a application, and a 3G wireless communication module comprising a wireless communication interface and coupled to the bus interface for enabling communication by signal between the 3G mobile communication apparatus and a base station; the method comprising steps of:

using software to form a plurality of virtual logical data channels from at least one physical communication port of the 3G mobile communication apparatus according to priority level of data of data packet transmitted by the 3G mobile communication apparatus, and coupling each of said virtual logical data channels to the data processing layer, wherein said virtual logical data channels comprise a first channel for actively providing an attach (AT) command, a second channel for transmitting a general AT command, and a third channel for transmitting the data packet;

creating a multi-channel protocol layer between said virtual logical data channels and the bus interface; and using the multi-channel protocol layer to determine data of a data packet received by the 3G mobile communication apparatus, and transmitting the data packet to the data processing layer through corresponding one of said virtual logical data channels according to priority level of the data of the data packet, wherein the data packet transmitted through said virtual logical data channels comprises an information data packet, or a control data packet being an acknowledgement packet (ACK) or a non-acknowledgement packet (NAK); and wherein the control data packet transmitted by the 3G mobile communication apparatus is the acknowledgement packet when the information data packet received by the 3G mobile communication apparatus is examined and found to be valid, and the control data packet transmitted by the 3G mobile communication apparatus is the non-acknowledgement packet when the information data packet received by the 3G mobile communication apparatus is examined and found to have an error; and wherein the information data packet has a format including the following fields:

a head field, for recording a head value to denote the beginning of the information data packet;

a channel number field, for recording a channel number of one of said virtual logical data channels used for transmitting the information data packet;

a packet count field, for recording a packet count value, wherein the packet count value is incremented by one when an information data packet is transmitted and remains unchanged when the information data packet is resent or the ACK or NAK control data packet is transmitted, each of said virtual logical data channels has a corresponding packet count value for counting independently, the packet count value of the channel is maintained by the 3G mobile communication apparatus who is receiving the data packet, when the current packet count value of the information data packet is equal to the previous packet count value plus 1, it shows that the data packet is received correctly and, when the packet count value is equal to the previous packet count value, it shows that the previous information data packet is resent and, when the packet count value is not equal to the previous packet count value plus 1 or the previous packet count value, it shows that there is a data loss of at least one of the information data packet;

a length field, for recording a length value whose range is determined by both communication parties, wherein the length value is a length of the content of the information data packet;

a content field, for recording the content of the information data packet;

a checksum field, for recording a checksum value which is equal to sum of the channel number, the packet count value and the length value recorded in the length field; and a tail field, for recording a tail value to denote an end of the information data packet.

2. The method of claim 1, wherein a state of the 3G mobile communication apparatus during a process of receiving the information data packet comprises:

a State 0, being a state of establishing multiple channels between both the communication parties and performing no packaging for the data transmitted between both the communication parties is the State 0;

a State 1 of waiting to receive the channel number;

a State 2 of waiting to receive the packet count value;

a State 3 of waiting to receive the length value in the low byte;

a State 4 of waiting to receive the length value in the high byte;

a State 5 of receiving the content of the information data packet whose length is denoted by the length value;

a State 6 of waiting to receive the checksum value; or a State 7 of waiting to receive the tail value.

3. The method of claim 2, wherein when the 3G mobile communication apparatus receives the information data packet, the multi-channel protocol layer performs the step of:

receiving a non-predetermined head value in the State 0, and remaining the state at the State 0, and processing a data being received as a general AT command data.

4. The method of claim 2, further comprising following steps for switching states:

receiving a predetermined head value in the State 0, and switching the state to the State 1; and receiving a predetermined head value continuously in the State 1, and remaining the state in the State 1, while it is necessary to acknowledge a four-predetermined head value for a count of every four predetermined head values of the received predetermined packet count value.

5. The method of claim 4, further comprising the step of:

switching the state to the State 2 after the channel number is received correctly in the State 1.

6. The method of claim 5, further comprising the step of:

switching the state to the State 3 after receiving the packet count value correctly in the State 2.

7. The method of claim 5, further comprising:

transmitting the acknowledgement packet, and switching the state to the State 7, when the packet count value is incorrect in the State 2.

8. The method of claim 6, further comprising steps of:

receiving 1 byte as a low byte in the State 3, and switching the state to the State 4; and receiving 1 byte as a high byte in the State 4, and merging the low byte and the high byte into the length value.

9. The method of claim 8, further comprising step of:

when the length value falls within a negotiated range agreed by both the communication parties and is considered to be a correct receipt, switching the state to the State 5.

10. The method of claim 8, further comprising step of:

when the length value does not fall within a negotiated range agreed by both the communication parties and is considered to have a data loss, switching the state to the State 7 after the non-acknowledgement packet is transmitted.

11. The method of claim 9, further comprising steps of:

receiving and counting the content of the information data packet in the State 5 and, when the length of the received data of the information data packet is smaller than the length, maintaining the state at the State 5.

12. The method of claim 9, further comprising steps of: receiving and counting the content of the information data packet in the State 5 and, when the length of the received data of the information data packet is equal to the length, showing that the content of the information data packet is received and switching the state to the State 6.

13. The method of claim 9, further comprising steps of: receiving and counting the content of the information data packet in the State 5 and, after the time for receiving the content of the information data packet is out, abandoning the current received information data packet and, after the non-acknowledgement packet is transmitted, returning the state to the State 1.

14. The method of claim 12, further comprising steps of: receiving 1 byte as the checksum value in the State 6, and comparing the checksum value with a checksum value calculated from the received data of the information data packet; when the checksum values are equal, then showing that the information data packet is received correctly, updating a counting of receipt on the channel and, after the non-acknowledgement packet is transmitted, switching the state to the State 7.

15. The method of claim 12, further comprising steps of: receiving 1 byte as the checksum value in the State 6, and comparing the checksum value with a checksum value calculated from the received data of the information data packet; when the checksum values are unequal, showing that there is an error of the information data packet and, after the non-acknowledgement packet is transmitted, switching the state to the State 7 waiting for receiving the information data packet resent.

16. The method of claim 7, further comprising steps of: abandoning the information data packet directly and maintaining the state unchanged, when a non-predetermined tail value is received in the State 7.

17. The method of claim 10, further comprising steps of: abandoning the information data packet directly, and maintaining the state unchanged, when a non-predetermined tail value is received in the State 7.

18. The method of claim 14, further comprising steps of: abandoning the information data packet directly, and maintaining the state unchanged, when a non-predetermined tail value is received in the State 7.

19. The method of claim 15, further comprising steps of: abandoning the information data packet directly, and maintaining the state unchanged, when a non-predetermined tail value is received in the State 7.

20. The method of claim 7, further comprising step of: switching the state to the State 1, when a predetermined tail value is received in the State 7.

21. The method of claim 10, further comprising step of: switching the state to the State 1, when a predetermined tail value is received in the State 7.

22. The method of claim 14, further comprising step of: switching the state to the State 1, when a predetermined tail value is received in the State 7.

23. The method of claim 15, further comprising step of: switching the state to the State 1, when a predetermined tail value is received in the State 7.

24. The method of claim 1, wherein a state of the 3G mobile communication apparatus during a process of transmitting the information data packet includes:
    a State 0, being entered after a multi-channel transmission is created between both the communication parties or when no data packet is transmitted; or
    a State 1, being switched thereto after the information data packet is transmitted, for waiting the acknowledgement packet or the non-acknowledgement packet.

25. The method of claim 24, wherein when the 3G mobile communication apparatus is transmitting the information data packet, the multi-channel protocol layer changes the state of the 3G mobile communication apparatus according to the following condition:
    switching the state to the State 1 when it is necessary to transmit the information data packet in the State 0 or after transmitting the information data packet.

26. The method of claim 25, further comprising step of: returning the state to the State 0, after receiving the acknowledgement packet in the State 1.

27. The method of claim 25, further comprising step of: resending the information data packet and then remaining the state at the State 1 when the time for receiving the non-acknowledgement packet or the information data packet content in the State 1 is out.

* * * * *